United States Patent Office 3,231,591
Patented Jan. 25, 1966

3,231,591
CIS-TRANS ISOMERIZATION OF UNSATURATED
FATTY ACIDS AND THEIR GLYCERIDES
Harry R. Gamrath, St. Louis, and Louis O. Raether,
Webster Groves, Mo., assignors to Monsanto Company,
a corporation of Delaware
No Drawing. Filed Apr. 23, 1962, Ser. No. 189,285
13 Claims. (Cl. 260—405.6)

This invention relates to isomerization and particularly to an improved method for the isomerization of unsaturated fatty acids and their glycerides.

While the nutritive values of the commonly occurring unsaturated fats and unsaturated fatty acids have long been recognized, their adaptability for utilization in most products has been severely limited because they are liquid at room temperature. These materials can be hydrogenated to provide solid compositions which are the saturated counterparts of the original materials, and such saturated fats have enjoyed wide-spread usage. However, recent medical evidence strongly indicates that it would be preferable to use solid unsaturated fats rather than the corresponding saturated compounds. It has been found that the ingestion of saturated fats increases the blood cholesterol level whereas lower cholesterol levels result from the ingestion of unsaturated fatty acids, their esters and glycerides. Therefore, there is a definite and unsatisfied need for solid unsaturated fatty food components. Numerous efforts have been made to raise the melting point or solidify liquid fats and unsaturated fatty acids to fulfill this need. These previously proposed processes involved the isomerization of these materials from their naturally occurring cis form to the solid trans form. Such prior art methods, relying upon the utilization of metallic catalysts such as nickel, selenium and tellurium or the oxides of nitrogen such at nitrogen tetroxide, have no commercial feasibility because of the unsatisfactory nature of the catalyst employed. Selenium and tellurium are exceedingly toxic and cannot be tolerated in food products even in exceedingly small quantities. While nitrogen tetroxide is non-toxic it is wanting in efficiency. Thus isomerization processes utilizing this and related catalysts are quite slow and incomplete. Furthermore, since the oxides of nitrogen are at best only sparingly soluble in water or in fats, their utilization involves cumbersome and inconvenient methods of operation.

It is therefore an object of the present invention to provide a new and novel method for solidifying or elevating the melting point of unsaturated fatty materials. A more specific object of the present invention is to provide an improved process for the cis-trans isomerization of unsaturated fatty acids, their esters and glycerides. A further object of the invention is to provide improved processes for the preparation of a metabolizable fat.

These and other objects are accomplished in accordance with the present invention, generally stated, by contacting the unsaturated fatty acids, their esters or glycerides with perchloric acid. The requisite intimate contact between the fatty material and the perchloric acid is most readily effected by uniformly distributing perchloric acid throughout the material being treated. This contact is maintained at a temperature above the melting points of the naturally occurring fatty material and of its trans isomer until the isomerization to the trans form is essentially complete. Since perchloric acid is readily soluble in water, this catalyst is very easily removed upon completion of the isomerization.

More specifically this invention contemplates heating the unsaturated fatty acids or their glycerides with between about 0.015% and about 4% perchloric acid by weight until the oily substances have been converted to their higher melting trans isomers. The process of the present invention is applicable to the treatment of substantially all unsaturated fatty acids and of their esters and glycerides. However, since the trans isomers of unsaturated fatty acids and esters thereof having less than 12 carbon atoms in their alkyl chains are liquid at room temperature, the advantages of the present invention are more pronounced when the acids and esters being treated contain at least 12 carbon atoms in their alkyl chains. Likewise very few of the naturally occurring unsaturated fatty acids and unsaturated fatty acid esters contain more than 26 carbon atoms in the acid portion of the molecule. Therefore, in isomerizing unsaturated fatty acids and unsaturated fatty acid esters in accordance with the present process, it is preferred to utilize unsaturated fatty acids and esters thereof containing between 12 and 26 carbon atoms in the acid portion of the molecule. While fats are classically defined as glyceryl esters of higher fatty acids, it is well known that naturally occurring fats are not pure compounds but consists of a variety of complex mixtures. Although glyceryl trioleate is the most prevalent unsaturated fatty acid glyceride in low melting fats, the amount of this component present varies over a wide range, depending upon the source of the fat. In some naturally occurring fatty products its content (expressed as oleic acid) may be as low as about 10%; whereas other natural fats may consist of one-half or more of this glyceride. The remaining constituents of natural fats are esters and glycerides of other fatty acids, saturated or unsaturated, having between 4 and 26 carbon atoms. The present process is equally applicable to such mixtures and to substantially pure glycerides of unsaturated fatty acids, such as glyceryl trioleate. However, the effect of the isomerization on the melting point is greater with materials having greater unsaturate contents. The term "glyceride" as used herein normally refers to the triglyceride, but also includes the naturally occurring mono- and di-glycerides. The term "ester" designates the condensation product of mono- and dihydroxy alcohols with unsaturated fatty acids.

The conditions under which the present process is conducted will naturally vary dependent upon the particular type of raw material being treated. While in all instances the temperature must be above the melting point of both isomeric forms of the raw material, it can vary between relatively wide limits. However, for most practical purposes the isomerization process is preferably conducted at temperatures between about 60° C. and about 100° C. At temperatures below this lower limit the isomerization is inordinately slow, whereas temperatures materially in excess of about 100° C. tend to introduce hazards into the process. The time required to effect the rearrangement is at least in part a function of the temperature employed. Thus the process is generally more rapid at elevated temperatures. In most instances, however, it has been found that the isomerization requires between about 2 and about 10 hours to go to substantial completion.

The process of the present invention is normally conducted at atmospheric pressure. While reduced and superatmospheric pressures can be employed in some instances, they generally do not enhance the efficiency of the operation. The process is mechanically simple and readily adaptable for execution in any suitable type of conventional reaction vessel. It is only necessary that the reaction apparatus be provided with suitable heating means and with an agitation system to insure a substantially uniform dispersion of the perchloric acid throughout the fatty material being treated.

As pointed out above, the amounts of perchloric acid can vary between about 0.015% and about 4% based on the weight of the material being treated. However, since anhydrous perchloric acid is relatively unstable, the acid is used in an aqueous solution. Solutions of acid containing between about 72% and 78% perchloric acid are commercially available and thus are the preferred catalytic agent in accordance with this invention. In most instances the more concentrated acids or acid solutions containing 78% perchloric acid are employed to minimize the volume of material in process. Dilute perchloric acid solutions can of course be used, but they merely increase the amount of water in process. When 78% perchloric acid is used, it has been found that the amount required to catalyze the isomerization varies between about 0.02% and about 5% based on the weight of the starting material. With increasing proportions of perchloric acid, proper precautions must definitely be taken to avoid the danger of violent explosion. Thus because of the care required in using up to 5% of the 78% acid, it is preferred to use a maximum of about 2% based on the weight of the fatty material being treated. Therefore, in general it is preferred to employ between about 0.02% and about 2% of 78% perchloric acid. When smaller amounts are employed they have little or no effect on the isomerization.

While it is normally preferred to employ water solutions of perchloric acid solutions, equivalent amounts of soluble perchlorates can in some instances be used with equal facility. For example, unsaturated fats and fatty acids may in some instances be obtained by treatment with strong mineral acids, and the unsaturated fatty materials of this type contain residual amounts of the mineral acids such as sulfuric, hydrochloric and the like. Such acidified materials can be isomerized by adding thereto a water soluble alkali perchlorate salt which reacts with the mineral acid to release perchloric acid in situ. Likewise unsaturated fatty acids and their glycerides containing no residual mineral acid can be isomerized in substantially the same manner by adding a strong acid to them prior to the addition of a perchlorate.

At the completion of the isomerization which can be determined by melting point elevation, by infrared absorption or the like, the perchloric acid can be readily removed from the treated fatty material by washing with water. This is most conveniently accomplished by vigorously agitating water with the product so as to form a uniform unstable dispersion, permitting the dispersion to stratify and separating the water layer. This process is generally repeated two or more times and preferably the first portion of wash water is slightly alkaline to promote neutralization of perchloric acid. This alkalinity can be provided by the addition of approximately 1% sodium bicarbonate or the like.

The process of the present invention is readily adaptable to substantially all naturally occurring liquid vegetable oils and to unsaturated fatty acids contained therein. Examples of oils that can be beneficially treated in this manner include linseed, tung, oiticica, safflower, soya, almond-kernel, neat's-foot, cottonseed, cocoa butter, corn and the like. Suitable unsaturated fatty acids include dodecylenic, palmitoleic, oleic, ricinoleic, petroselinic, vaccenic, linoleic, linolenic, licanic, parinaric, gadoleic, arachidonic, cetoleic, erucic, selacholeic, tall oil fatty acids and the like.

The invention will be more readily understood by reference to the following specific examples of preferred embodiments thereof. The proportions set forth in these examples and throughout the specification are in parts by weight unless otherwise indicated.

*Example 1*

About 200 parts of corn oil and about 1 part of an aqueous perchloric acid solution having a concentration of about 72% are introduced into a reaction vessel provided with heating means and an agitator capable of maintaining the perchloric acid dispersed throughout the corn oil. The uniformity of the mixture is retained by continued agitation while the temperature is elevated to about 70° C. Then sufficient heat is applied to the contents of the vessel to keep the temperature between about 70° C. and about 80° C. The temperature of the mixture is held within this range until the isomerization of the unsaturated fatty acid glycerides, such as triolein and trilinolein, to their trans form is substantially complete. The progress of the isomerization can be readily monitored by following the appearance and increase in intensity of the trans double bond absorption in the infrared spectrum of the reaction mass. Alternately the isomerization can be detected by the determination of the melting points of intermittent samples taken from the reaction mix. The isomerization of the corn oil is substantially complete after about 5 hours.

While maintaining the temperature, about 100 parts of a 2% aqueous sodium bicarbonate solution are added to the reaction mixture and thoroughly mixed therewith for about 10 minutes. This intimate contact between the reaction mix and the bicarbonate solution promotes the concurrent neutralization and extraction of the perchloric acid from the isomerized oil. After this washing period, the agitation is stopped, the sodium bicarbonate solution is permitted to stratify and is then removed from the oil by decantation or by any other suitable means. The oil is then washed in like manner with two successive 250 part portions of water at about 75-80° C. After the final water wash is removed, the oil is dried by heating the product under reduced pressure until the final condition of about 100° C. and about 50 mm. of mercury is attained, which condition is maintained for about a half hour.

The isomerization causes no readily discernible difference in the taste, odor or color of the corn oil. Likewise, the iodine numbers of the starting material and of the product are substantially identical. The only significant change apparent in the oil is the elevation of its melting point. While the naturally occurring corn oil prior to treatment has a melting point of about −10° C. or less, its trans isomer obtained by the present process melts at about 12° C.

*Example 2*

About 200 parts of substantially pure oleic acid and about 2 parts of 78% aqueous perchloric acid are placed in a suitable reaction vessel as described above. The oleic acid and the perchloric acid are thoroughly agitated to provide a uniform mixture which is maintained throughout the isomerization process with continued agitation. The agitated mixture is heated to a temperature of about 85-95° C. and maintained within that range for approximately 4 hours. At the end of this period, the cis-trans isomerization is substantially complete as evidenced by the intensity of the trans double bond absorption in the infrared spectrum of the mixture. The isomerization mixture is then neutralized, washed and dried in substantially the same manner as described in connection with the process of Example 1.

Substantially all of the oleic acid entering the process is converted to its trans isomer, elaidic acid. By this simple expedient oleic acid melting at about 14° C. is transformed to an unsaturated material melting at about 51° C. This latter value corresponds closely with the reported melting point of 51.5° C. for pure elaidic acid.

In like manner the isomerization of substantially all cis type unsaturated fatty acids and their glycerides as well as fixed oils containing them can be effected. The influence of the present process on the melting points of the products being treated of course varies with their degree of unsaturation. Thus the beneficial results are more pronounced when the material subjected to the process contains a relatively large proportion of unsaturates. The melting point modification of a number of unsaturated fatty acids and their glycerides obtained in accordance with the present invention is indicated below. In each instance the approximate melting point of the cis material indicates the original melting point of the substance while trans value reflects the melting point of the isomers obtained by the present process.

| Fatty Material | Melting point, °C. | |
| --- | --- | --- |
| | Cis | Trans |
| Linoleic acid | −5 | 54 |
| Linolenic acid | −11 | 30 |
| Cocoa butter | 36 | 115 |
| Castor oil | 5 | 53 |
| Cocoanut oil | 26 | 50 |
| Peanut oil | 13 | 40 |
| Triolein | 5 | 52 |

From the above it is evident that the present invention is generally applicable to the treatment of material containing cis isomers of unsaturated fatty acids as well as the unsaturated fatty acids themselves. The isomerization and melting point elevation is attained by the use of a non-toxic, water soluble readily available catalyst. Thus the catalytic agent can be easily removed from the reaction product. Also the process of the present invention is readily adaptable to conventional commercial apparatus and operation.

Although the present invention has been described with particular reference to edible products, it is self-evident that its utility is not restricted to the foodstuff area. Thus esters of numerous trans acids prepared in accordance with this invention are useful as plasticizers. Also, solid esters of trans acids prepared in this manner are adaptable for use as high temperature lubricants. Many other advantageous characteristics and commercial adaptations of the products obtained by the process of the present invention will readily present themselves to those skilled in the art.

Numerous modifications will readily suggest themselves to those skilled in the art. Thus, while the invention has been described with particular reference to specific embodiments, it is to be understood that it is not to be limited thereto but is to be construed broadly and restricted solely by the scope of the appended claims.

The embodiments of the invention in which an exclusive property or privilege is claimed are defined as follows:

1. A method for the cis-trans isomerization of a melted substance selected from the group consisting of unsaturated fatty acids and glycerides thereof which comprises contacting said substance with perchloric acid.

2. A method for the cis-trans isomerization of a melted substance selected from the group consisting of unsaturated fatty acids and glycerides thereof which comprises contacting said substance with between about 0.015% and 4% perchloric acid by weight.

3. A method for the cis-trans isomerization of a melted substance selected from the group consisting of unsaturated fatty acids and glycerides thereof which comprises contacting said substance with between about 0.015% and about 4% perchloric acid by weight at a temperature between about 60° C. and 100° C.

4. A method for the cis-trans isomerization of a melted substance selected from the group consisting of unsaturated fatty acids and glycerides thereof which comprises contacting said substance with between about 0.015% and about 4% perchloric acid by weight at a temperature between about 60° C. and 100° C. for a period of between about 2 and about 10 hours.

5. A method for the cis-trans isomerization of a melted substance selected from the group consisting of unsaturated fatty acids and glycerides thereof which comprises contacting said substance with between about 0.015% and about 1.5% perchloric acid by weight.

6. A method for the cis-trans isomerization of a substance selected from the group consisting of unsaturated fatty acids and glycerides thereof which comprises contacting said substance with between about 0.015% and about 1.5% perchloric acid by weight at a temperature between about 60° C. and 100° C. for a period of between about 2 and about 10 hours.

7. A method for the cis-trans isomerization of oleic acid which comprises contacting the oleic acid with between about 0.015% and about 1.5% perchloric acid by weight at a temperature between about 60° C. and 100° C. for about 2 to about 10 hours.

8. A method for the cis-trans isomerization of glycerides of oleic acid which comprises contacting the glycerides with between about 0.015% and about 1.5% perchloric acid by weight at a temperature between about 60° C. and 100° C. for about 2 to about 10 hours.

9. A method for the cis-trans isomerization of linoleic acid which comprises contacting linoleic acid with between about 0.015% and about 1.5% perchloric acid by weight at a temperature between about 60° C. and 100° C. for about 2 to about 10 hours.

10. A method for the cis-trans isomerization of tall oil fatty acids which comprises contacting tall oil fatty acids with between about 0.015% and about 1.5% perchloric acid by weight at a temperature between about 60° C. and 100° C. for about 2 to about 10 hours.

11. A method for the cis-trans isomerization of corn oil which comprises contacting corn oil with between about 0.015% and about 1.5% perchloric acid by weight at a temperature between about 60° C. and 100° C. for about 2 to about 10 hours.

12. A method for the cis-trans isomerization of soya oil which comprises contacting soya oil with between about 0.015% and about 1.5% perchloric acid by weight at a temperature between about 60° C. and 100° C. for about 2 to about 10 hours.

13. A method of making metabolizable material which comprises substantially uniformly dispersing between about 0.015% and about 4% perchloric acid by weight throughout a substance selected from the group consisting of unsaturated fatty acids and their glycerides, and maintaining the dispersement at a temperature between about 60° C. and about 100° C. for about 2 to about 10 hours.

References Cited by the Examiner

Noyce et al.: J. Am. Chem. Soc., 81, 5423–5428 (1959).

Steinberg et al.: J. Am. Chem. Soc., 82, 5263–5279 (1960).

Yao, Chem. Abs. 53, 15028C (1959).

CHARLES B. PARKER, *Primary Examiner.*

DANIEL D. HORWITZ, *Examiner.*